(12) United States Patent
Schenker et al.

(10) Patent No.: US 6,193,340 B1
(45) Date of Patent: Feb. 27, 2001

(54) SNAP-TOGETHER FILE STORAGE SYSTEM

(75) Inventors: David A. Schenker, Cedarburg; Jeffrey M. Kildow, Burlington, both of WI (US)

(73) Assignee: Geographics, Inc., Blaine, WA (US)

(*) Notice: Subject to any disclaimer, the term of this patent is extended or adjusted under 35 U.S.C. 154(b) by 0 days.

(21) Appl. No.: 09/368,272

(22) Filed: Aug. 3, 1999

(51) Int. Cl.⁷ ................................................ A47B 47/00
(52) U.S. Cl. ................................ 312/265.5; 312/348.1; 312/111; 312/108
(58) Field of Search .......................... 312/107, 108, 312/111, 257.1, 263, 265.5, 265.6, 350, 330.1, 334.7, 334.12, 334.19, 334.21, 334.41, 334.42, 334, 43, 244; 220/4.28, 682, 691; 206/508

(56) References Cited

U.S. PATENT DOCUMENTS

| | | |
|---|---|---|
| D. 402,836 | 12/1998 | Waddell . |
| 3,203,744 * | 8/1965 | Batke et al. ................. 312/108 X |
| 3,305,286 * | 2/1967 | Fenwick ..................... 211/187 X |
| 3,848,942 * | 11/1974 | Fanini ........................... 312/265.5 |
| 3,860,119 | 1/1975 | Irvine et al. . |
| 3,918,781 * | 11/1975 | Paris ............................. 312/111 |
| 4,079,531 | 3/1978 | Norris et al. . |
| 4,093,327 * | 6/1978 | Linger ........................... 312/244 |
| 4,120,551 * | 10/1978 | Godtschalck ................. 312/348.1 |
| 4,169,639 | 10/1979 | Zola . |
| 4,232,920 | 11/1980 | Bukaitz . |
| 4,469,231 | 9/1984 | Hehn . |
| 4,625,879 | 12/1986 | Liu . |
| 4,664,283 | 5/1987 | Liu . |
| 4,712,844 | 12/1987 | Fry . |
| 5,002,191 | 3/1991 | Herbst . |
| 5,205,626 | 4/1993 | Fotioo . |
| 5,211,457 | 5/1993 | Lupynec . |
| 5,251,974 | 10/1993 | Beals . |
| 5,339,969 | 8/1994 | Filipowski . |
| 5,340,207 | 8/1994 | Chen . |
| 5,372,415 * | 12/1994 | Tisbo et al. ..................... 312/263 X |
| 5,396,996 | 3/1995 | Box . |
| 5,407,074 | 4/1995 | Brightbill et al. . |
| 5,447,334 | 9/1995 | Hartsock . |
| 5,466,058 * | 11/1995 | Chan ............................. 312/111 |
| 5,681,102 * | 10/1997 | Forsgren ....................... 312/334.1 |
| 5,697,870 * | 12/1997 | Osborn . |
| 5,816,674 * | 10/1998 | Manos et al. ................. 312/108 X |
| 5,842,570 | 12/1998 | Turnbull . |
| 5,855,423 | 1/1999 | Cram . |
| 5,913,580 * | 6/1999 | Liu ................................. 312/108 |
| 5,918,954 * | 7/1999 | Papadakis et al. ............ 312/265.5 X |

FOREIGN PATENT DOCUMENTS 297 17 716
U1  1/1998 (DE) .

* cited by examiner

Primary Examiner—Janet M. Wilkens
(74) Attorney, Agent, or Firm—Michael Best & Friedrich LLP

(57) ABSTRACT

A snap-together file storage system includes a plurality of storage units stacked on each other. Each storage unit includes a cabinet having a forwardly-opening cavity, and a drawer slidably received with in the cavity. The cabinet and drawer are constructed of plastic panels that are locked together by way of tabs of a first panel inserted into slots of an adjacent panel. The panels may be disassembled by removing the tabs from the slots. One or more optional accessories may be mounted on the storage units by way of tongues inserted into tabs.

25 Claims, 7 Drawing Sheets

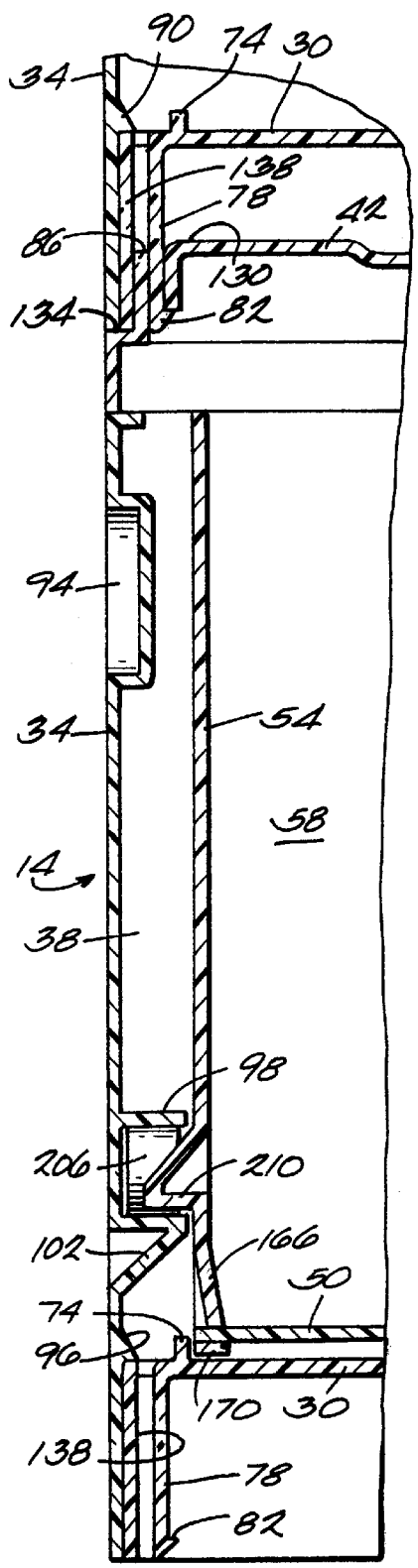
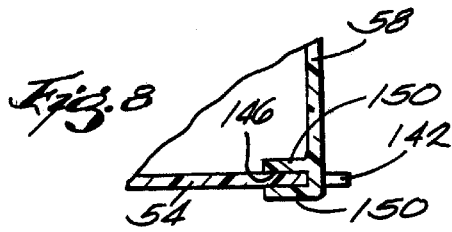
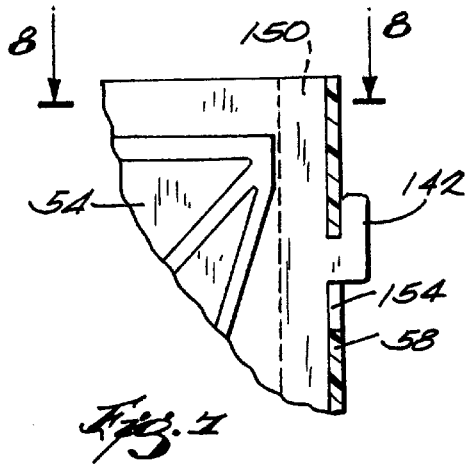
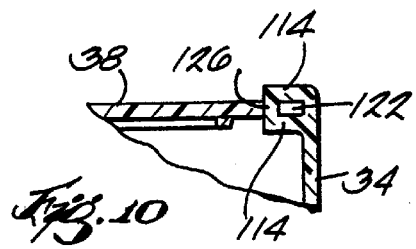
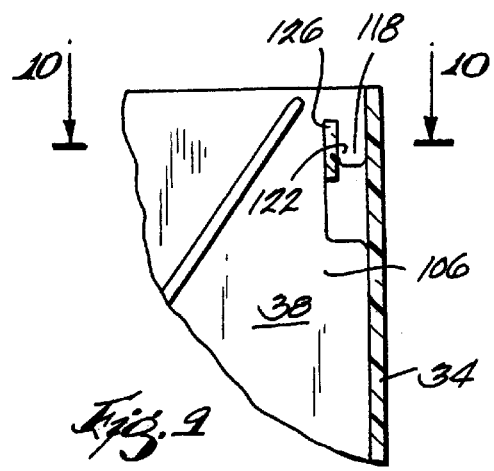
Fig. 6
Fig. 8
Fig. 7
Fig. 10
Fig. 9

SNAP-TOGETHER FILE STORAGE SYSTEM

FIELD OF THE INVENTION

The invention relates to file storage containers. More specifically, the invention relates to snap-together file storage containers.

BACKGROUND

Typical prior art file cabinets are metal file cabinets that are assembled with the use of fasteners and tools by the manufacturer. The assembled file cabinet is then shipped to a store where it is sold and typically delivered to the purchaser in its assembled condition.

It is known to construct file storage containers of plastic and other materials. It is also known to sell file storage containers in panel form that are intended to be snapped together by the end user.

SUMMARY

One problem that has been identified with known file cabinets is that the file cabinets are assembled by the manufacturer. Thus, an assembled file cabinet is stored by the manufacturer, shipped to the retail store, stored by the retailer or displayed on the sales floor, and delivered to the customer. Assembled file cabinets tend to be bulky, and, because shipping and storage costs are often associated with the amount of space occupied by the item, may be expensive to ship and store. Also, because assembled file cabinets are relatively bulky items, they may be difficult to maneuver around in a store or warehouse without bumping into other items and causing damage to the file cabinet and/or the other items.

It is known to provide a plastic file storage container consisting of a plurality of panels that are snapped together by the end user of the container. However, these known file storage containers typically do not include the functional benefits of a file cabinet. For example, it is very difficult to manufacture plastic panels having the proper rollers and guides to create a plastic, snap-together file cabinet having a drawer slidably received within a cabinet. Consequently, known plastic snap-together file storage containers typically do not include a slidable drawer.

It would be advantageous to manufacture, store, and ship a file cabinet or other file storage container in a disassembled condition where the various panels from which the file cabinet is constructed are stacked and contained in a shipping box. Significant shipping and storage savings may arise from providing a disassembled file cabinet in a box due to the relatively small space occupied by the disassembled file cabinet. The box would also substantially protect the panels from dents and scratches while the box is being moved.

The present invention provides a file container unit comprising a cabinet defining a cavity, and a drawer slidably received within the cavity. The cabinet is assemblable without the use of tools. Preferably, the drawer is also assemblable without the use of tools, and both the drawer and the cabinet are constructed of a plurality of plastic molded panels. Preferably, the panels are interconnected with tongues inserted into slots, and the panels may be disconnected from each other without the use of tools and without damage to the panels. Preferably, the drawer includes a pair of rollers that are movable within guides to assist sliding the drawer into and out of the cavity.

The invention also provides a modular file storage system that may be fitted with accessories for the storage of items other than files. A number of file container units may be stacked, one on top of the other, to create a file cabinet having a plurality of drawers. Slots and tabs in the tops and bottoms of each unit cooperate to interconnect with the adjacent units. An accessory, such as utility drawer or storage bin, may be interconnected with the top of the uppermost file storage unit for additional storage capacity.

Other features and advantages of the invention will become apparent to those skilled in the art upon review of the following detailed description, claims, and drawings.

BRIEF DESCRIPTION OF THE DRAWINGS

FIG. 6 is a cross-section view of a portion of the storage system taken along line 6—6 in FIG. 1.

FIG. 7 is an enlarged cross-section view of a portion of the drawer shown in FIG. 3.

FIG. 8 is a cross-section view taken along line 8—8 in FIG. 7.

FIG. 9 is an enlarged cross-section view of a portion of the cabinet shown in FIG. 1.

FIG. 10 is a cross-section view taken along line 10—10 in FIG. 9.

Figure 1:
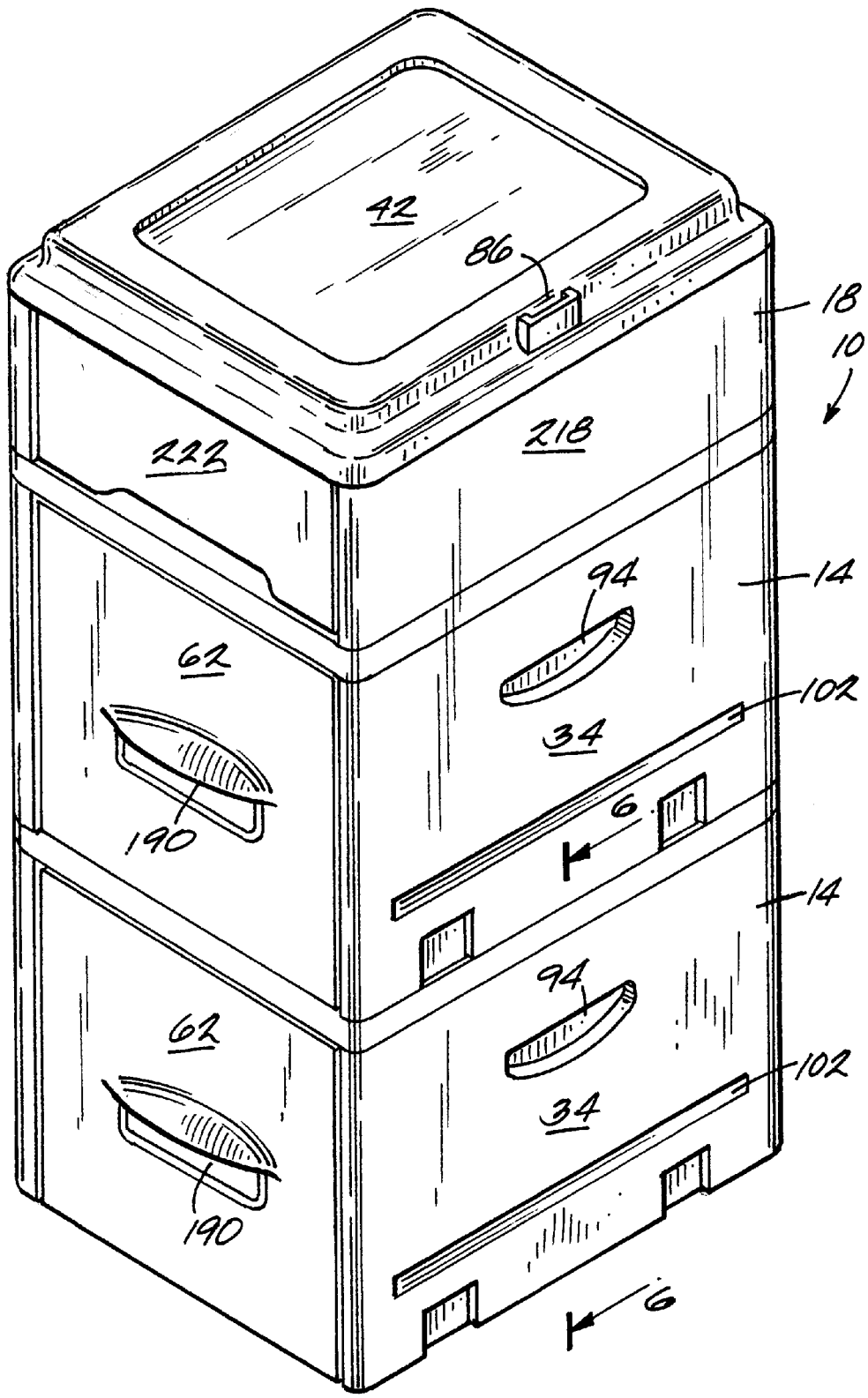
FIG. 1 is a perspective view of a modular file storage system according to the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

FIG. 1 illustrates a modular file storage system 10 including a plurality of file storage units 14 stacked on top of one another. An optional accessory 18, such as an all-purpose storage drawer is stacked on top of the file storage units 14. Alternatively, the accessory 18 may be positioned beneath at least one of the stacked units 14.

Figure 5:
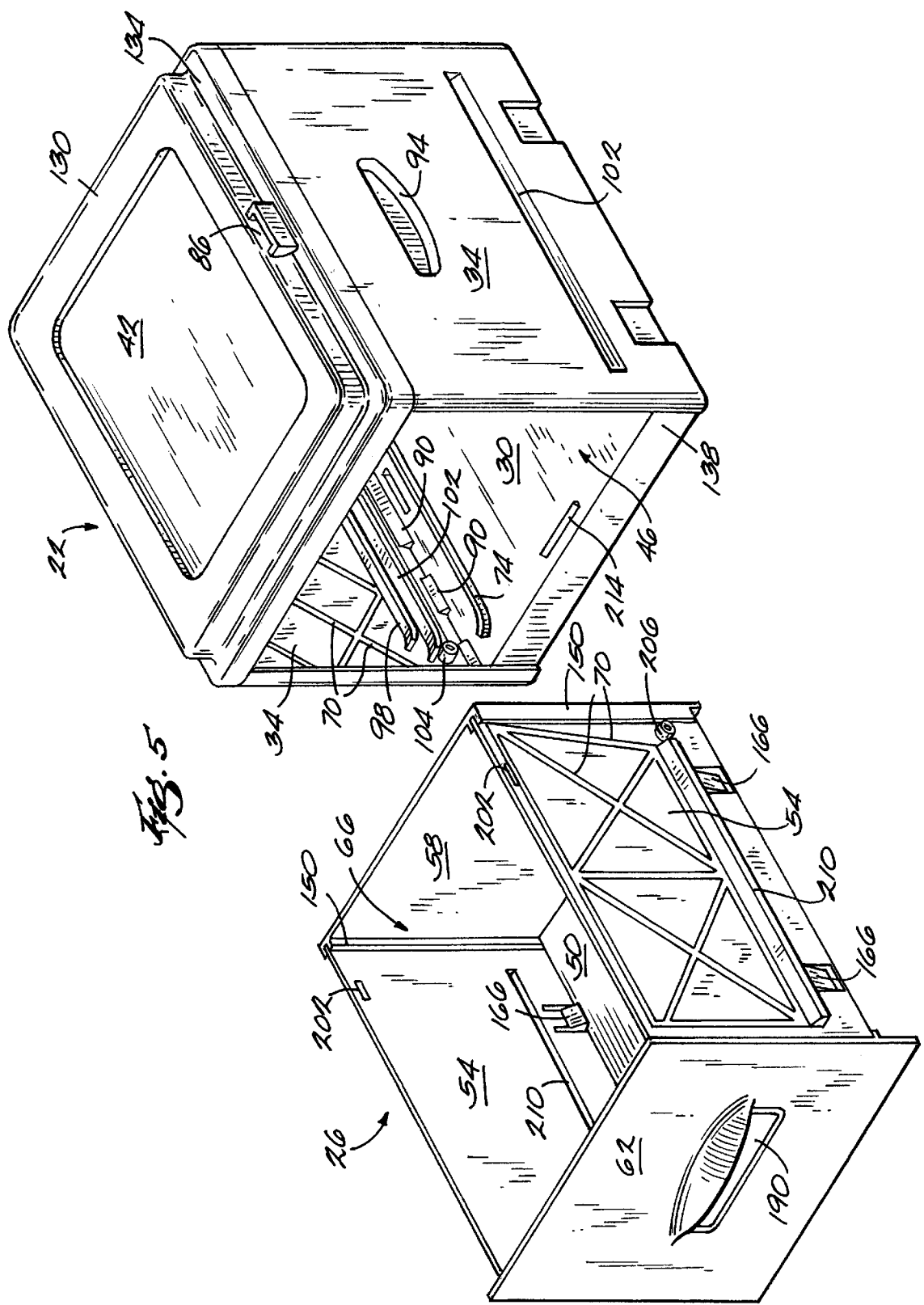
FIG. 5 is a top perspective view of the storage unit shown in FIG. 4.

FIGS. 2–5 better illustrate the component parts of one of the storage units 14. The storage unit 14 includes a cabinet 22 and a drawer 26. The cabinet 22 includes a bottom panel 30, first and second side panels 34, a rear panel 38, and a top panel 42. When assembled, the cabinet 22 defines a forwardly-opening cavity 46 (FIG. 5) into which the drawer 26 is slidably received. The drawer 26 includes a bottom panel 50, first and second side panels 54, a rear panel 58, and a front panel 62. When the drawer 26 is assembled, it defines an upwardly-opening cavity or receptacle 66 (FIG. 5).

In the illustrated arrangement of the invention, the panels for the cabinet 22 and the drawer 26 are constructed of injection-molded thermoplastic material. Preferably, the cabinet panels 30, 34, 38, 42 are made of high impact polystyrene, and the drawer panels 50, 54, 58, 62 are made of polypropylene. The panels for the drawer 26 and cabinet 22 include stiffeners or ribs 70 that are preferably integrally formed with the panels. The cabinet bottom panel 30 includes longitudinally-extending protrusions 74 on its upper surface, the significance of which is described below.

Figure 2:
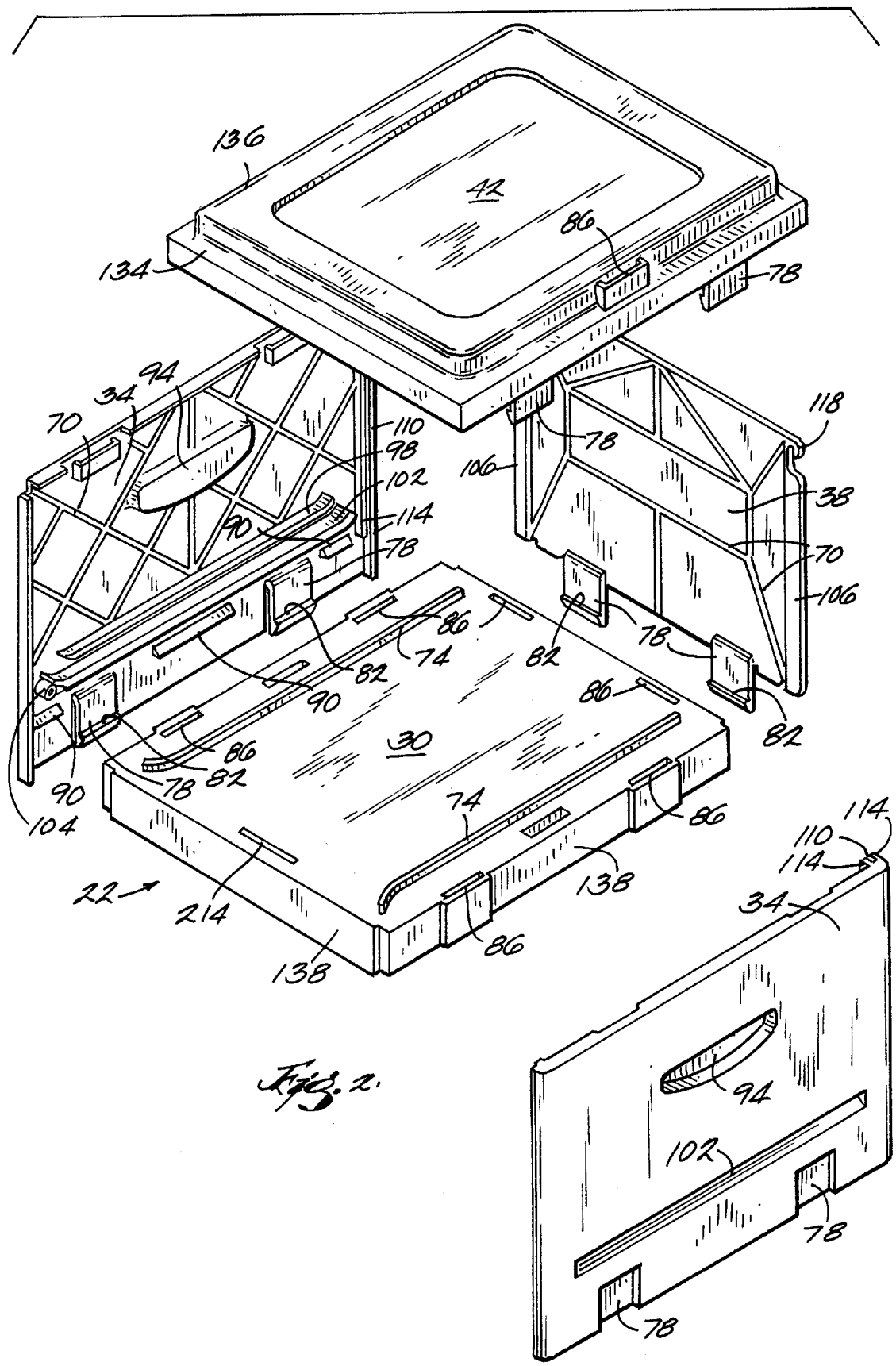
FIG. 2 is an exploded view of a cabinet of one storage unit embodying the invention.

Referring to FIG. 2, all of the cabinet panels 30, 34, 38, 42 include flexible tongues or tabs 78. Each tab 78 includes a ledge or protrusion 82. The flexible tabs 78 are movable between a lock position and a clearance position, and are biased toward the lock position. The cabinet side panels 34, bottom panel 30, and top panel 42 include slots or collars 86 into which a corresponding tab 78 may be inserted when the tab 78 is in the clearance position. The cabinet panels 30, 34, 38, 42 may be configured to have various combinations of slots 86 and tabs 78 other than that illustrated.

As seen in FIG. 6, when the tab 78 of a first panel (e.g., the bottom panel 30) is inserted far enough into the slot 86 of a second panel (e.g., the top panel 42), such that the ledge 82 clears the slot 86 of the second panel, the flexible tab 78 returns to the lock position, the second panel is sandwiched between the ledge 82 and the first panel, and the respective panels are locked together. A pair of interlocked panels may be unlocked by deflecting the flexible tab or tabs 78 from the lock position to the clearance position, and separating the respective panels.

Referring now to FIGS. 2, 5, and 6, the cabinet side panels 34 also include flanges or protrusions 90 that rest on top of the bottom panel 30 when the panels 30, 34 are locked together. Thus, the cabinet bottom panel 30 is sandwiched between the ledge 82 of the side panel tabs 78 and the flanges 90 on the side panels 34.

The cabinet side panels 34 may also include handles 94 for lifting the unit 14. The handles 94 may be recesses, formed in the side panels 34, as illustrated, or may extend away from the outer surface of the side panels 34. Each cabinet side panel 34 also includes a roller guide including an upper and a lower portion 98, 102 that extend into the cavity 46 from an inner surface of the side panel 34. The lower portion 102 of the roller guide may be formed by providing an indentation in the side panel 34 from the outside, as illustrated. The roller guides are used to slidably support the drawer 26, as described below. A roller 104, preferably made of Nylon and mounted on a shaft for rotation, is interconnected with the side panels 34 at the front end of the roller guide. The front of the lower portion 102 is curved upwardly to help resist unintentionally sliding the drawer 26 entirely out of the cavity 46.

Referring to FIGS. 2, 9, and 10, the cabinet rear panel 38 includes side edges 106 that are configured to be inserted into corresponding channels 110 (FIG. 2) in the respective side panels 34. The channels 110 are defined by a pair of parallel walls 114. The cabinet rear panel 38 is also provided with a pair of hook members 118 that are configured to engage eyes 122 in the side panels 34. The eyes 122 are defined by a wall 126 closing a portion of the channel 110. The hook and eye junction helps resist lateral deformation of the cabinet 22.

Referring now to FIGS. 2, 5, and 6, the top panel 42 includes a stepped surface having an upper portion 130 and a surrounding lower portion 134. The cabinet top and bottom panels 42, 30 are configured to permit stacking of the respective units 14. The top panel slots 86 receive the corresponding tabs 78 of the bottom panel 30 of a unit 14 stacked on top of it. The undersurface of the bottom panel 30 includes four depending walls 138 that define a recessed portion. The depending walls 138 rest on the lower portion 134 of the top panel 42 below them, and fit around the upper portion 130 of the top panel 42 such that the upper portion 130 is received within the recessed portion of the bottom panel 30.

With reference to FIGS. 3, 4, 7, and 8, the drawer side panels 54 include hook members 142 on their rear edges. The rear panel 58 includes a vertical channel 146 formed by two parallel walls 150, and a plurality of apertures 154 within the vertical channel 146. The side panels 54 and rear panel 58 are interconnected by inserting the rear edges of the side panels 54 into the respective vertical channels 146 on the rear panel 58, inserting the hooks 142 through the apertures 154, and then lowering the rear panel 58 with respect to the side panels 54. The hooks 142 then resist longitudinal movement of the rear panel 58 with respect to the side panels 54, and the vertical channels 146 resist lateral movement of the side panels 54 with respect to the rear panel 58.

Figure 3:
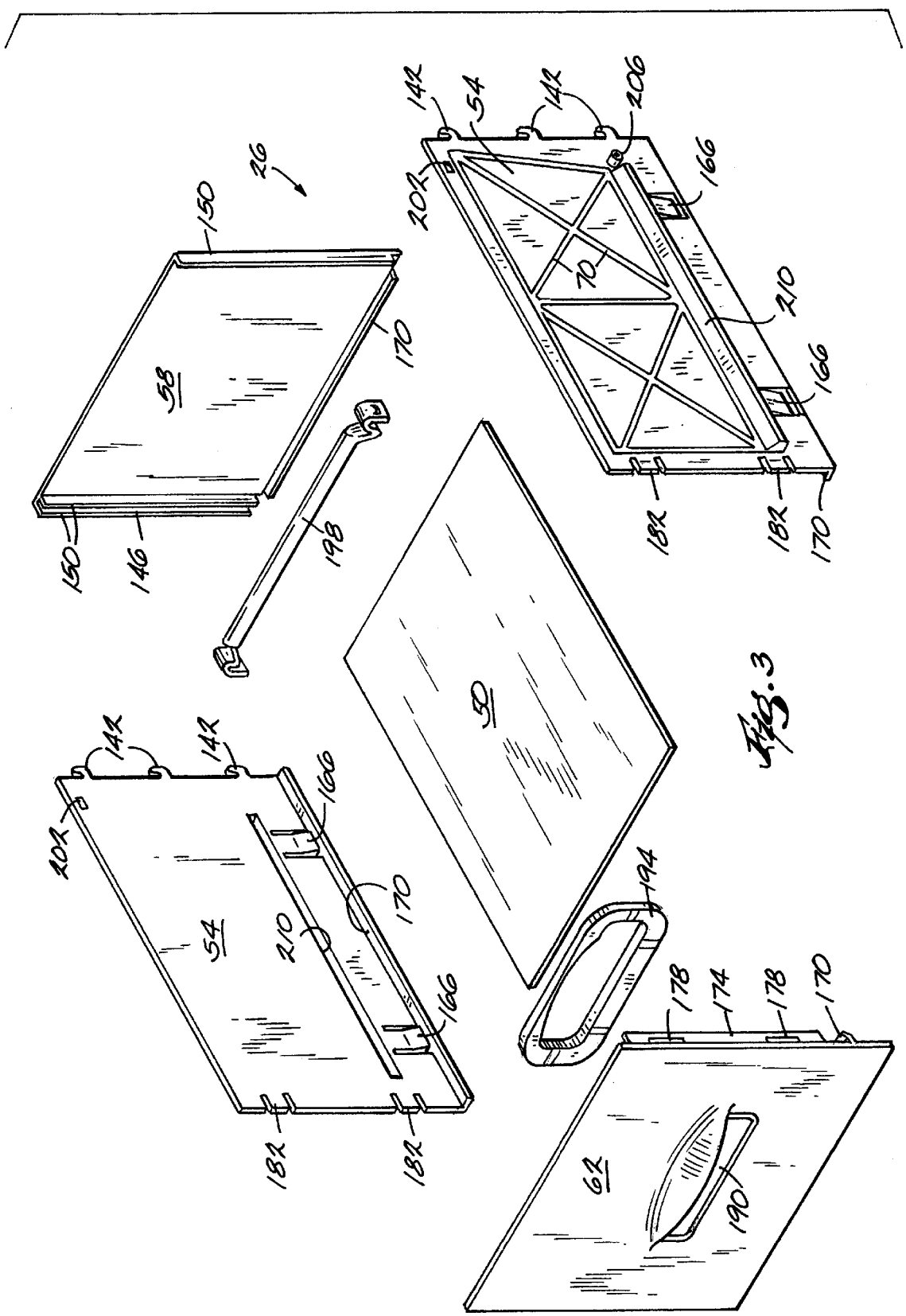
FIG. 3 is an exploded view of a drawer of a storage unit embodying the invention.
Figure 4:
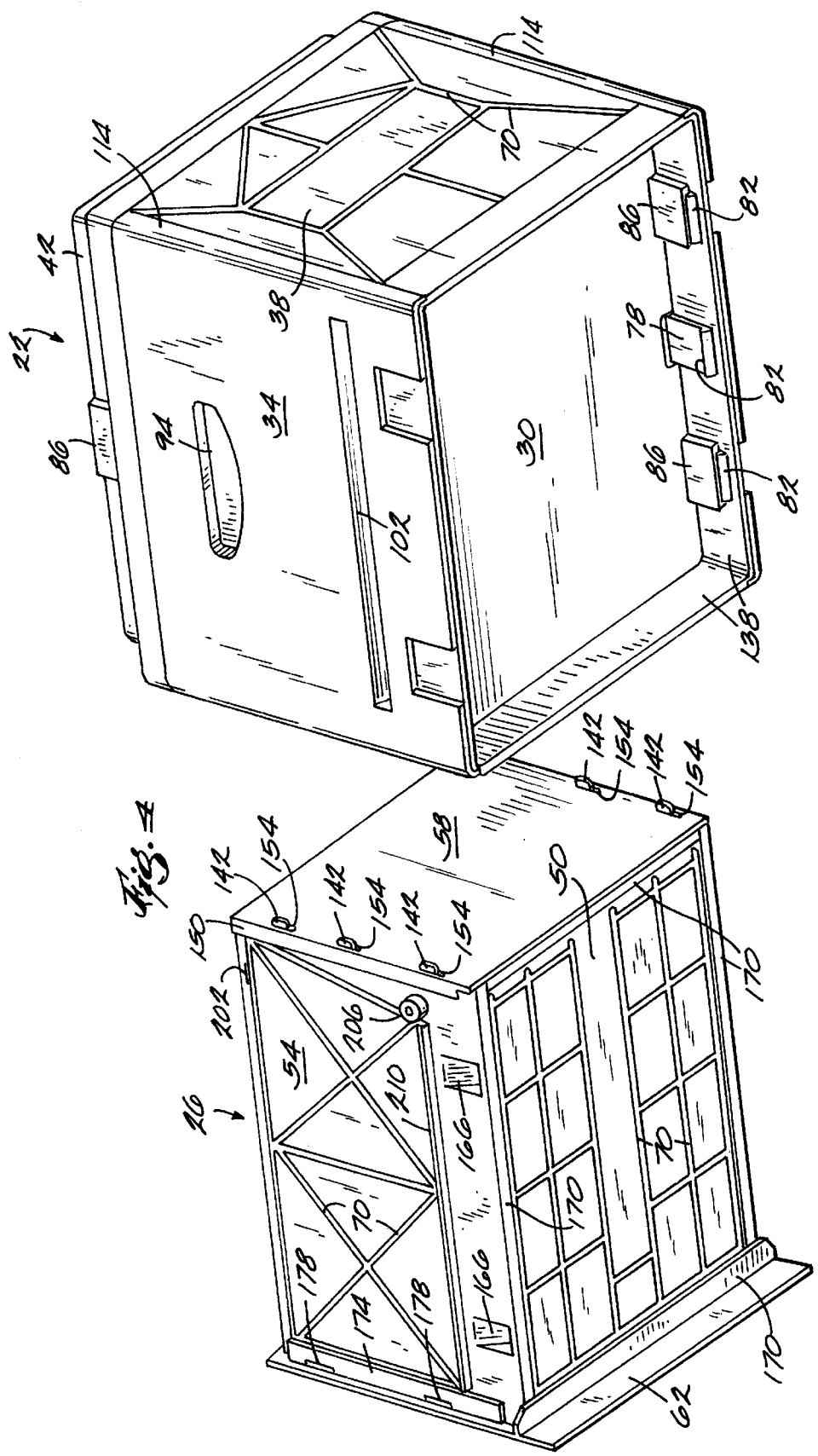
FIG. 4 is a bottom perspective view of the cabinet and drawer of the storage unit shown in FIGS. 2 and 3.
Figure 11:
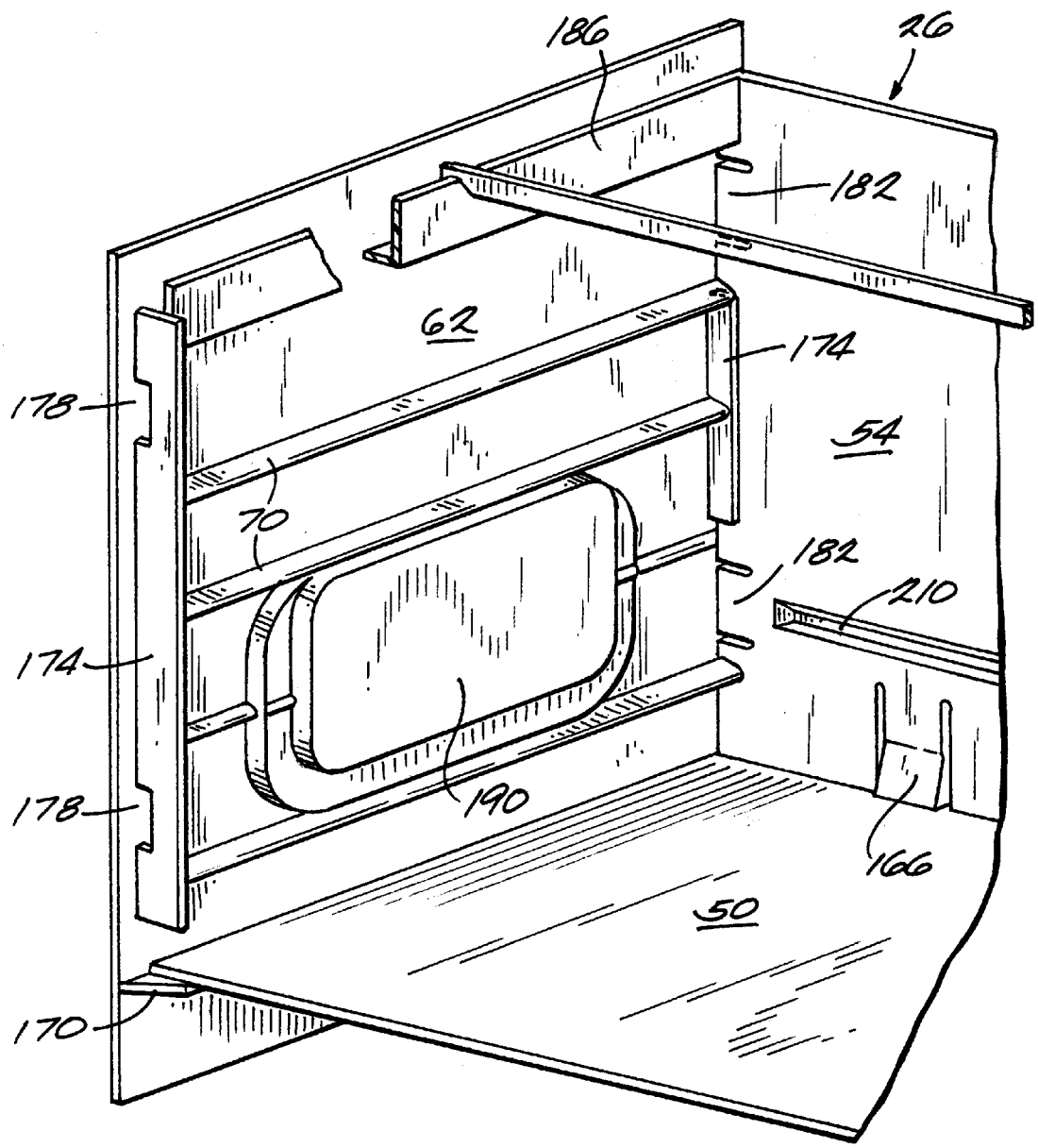
FIG. 11 is a perspective view of the drawer shown in FIG. 3 with a side panel removed.

As seen in FIGS. 3, 6, and 11, each drawer side panel 54 includes flexible tabs 166, and a bottom flange 170 extending horizontally from the bottom of the side panel 54. The front and rear panels 62, 58 also include bottom flanges 170. The drawer bottom panel 50 is supported by the flanges 170 of the front, rear, and side panels 62, 58, 54 of the drawer 26. The tabs 166 in the drawer side panels 54 deflect outwardly as the drawer bottom panel 50 is inserted, and spring back to abut the upper surface of the bottom panel 50, and hold the bottom panel 50 down against the flanges 170 when the bottom panel 50 is properly installed.

Referring to FIG. 11, the drawer front panel 62 includes horizontal stiffeners 70, and vertical walls 174 on either side of the front panel 62. The outer vertical walls 174 define slots 178. The front edges of the drawer side panels 54 are inserted between the walls 174, and the drawer side panel tabs 182 snap into the slots 178 in the outer vertical walls 174. A horizontal support 186 is also provided near the top of the drawer front panel 62. The drawer front panel 62 also includes a handle 190. The illustrated handle 190 is a recess formed in the front panel 62, and fitted with a shroud 194 (FIG. 3). Alternatively, the handle 190 may extend outwardly from the front panel 62.

Files for standard 8½"×11" paper may be stored in the drawer 26 transverse to the longitudinal axis of the drawer 26. If desired, hanging files may be hooked on the top edges of the drawer side panels 54 to hold standard size paper. A crossbar 198 (FIG. 3) may be mounted on the top edges of the drawer side panels 54. Apertures 202 are provided in the side panels 54 to accommodate the crossbar 198 and prevent it from sliding along the top edges of the side panels 54. The apertures 202 are disposed below the top edges of the side panels 54 so that hanging files for standard size paper may slide along the top edges of the side panels 54 without catching on the apertures 202. Hanging files for legal size paper may be supported by the horizontal support 186 on one end, and the crossbar 198 on the other end.

Drawer rollers 206, preferably made of Nylon, are rotatably mounted on stub shafts extending from the drawer side panels 54. The drawer side panels 54 also include protrusions 210 as illustrated. When the drawer 26 is properly installed within the cavity 46, the drawer rollers 206 roll within the roller guides, and the protrusions 210 extend between the upper and lower portions 98, 102 roller guides (FIG. 6). The cabinet rollers 104 contact the undersurface of the drawer bottom panel 50 and facilitate the insertion of the drawer 26 into the cabinet cavity 46. Alternatively, a single roller or a plurality of rollers may be provided on the bottom surface of the drawer bottom panel 50, and may ride in a guide member or members provided on or in the bottom panel 30 of the cabinet 22. The roller or rollers could also be interconnected to the rear drawer panel 58 and ride in a guide in the cabinet top and/or bottom panel 42, 30.

The outermost longitudinal stiffeners 70 on the undersurface of the drawer bottom panel 50 slide against the protrusions 74 in the cabinet bottom panel 30 to provide further lateral stability to the unit 14. A lip 214 formed in the cabinet bottom panel 30 resists the unintentional removal of the drawer 26 by hooking the bottom of the rear panel 58 of the drawer 26. A small space is provided between the undersurface of the drawer bottom panel 50 and the upper surface of the cabinet bottom panel 30 so that substantially all weight of the drawer 26 is supported by the rollers 104, 206.

Returning again to FIG. 1, the accessory 18 includes a bottom panel (not shown) and a top panel 42, that are substantially identical to the respective bottom and top panels 30, 42 of the cabinets 22. The accessory also includes side panels 218 and a rear panel (not shown) that are preferably shorter or equal in height to the side and rear panels 34, 38 of the cabinets 22, but that may be taller than the side panels and rear panels 34, 38 of the cabinets 22. The accessory 18 may serve one of several different purposes. The illustrated accessory 18 includes a clear plastic drawer 222 that may be used to store miscellaneous supplies other than files.

The side panels 218 and the rear panel of the accessory 18 lock into the top panel 42 and the bottom panel of the accessory 18 in substantially the same way as the cabinet side and rear panels 34, 38 lock into the cabinet top and bottom panels 42, 30, with tabs that extend through slots. The accessory 18 may be mounted on a file storage unit 14 in substantially the same way as the file storage units 14 are mounted on each other. Likewise, a file storage unit 14 may be mounted on the top of the accessory 18 in substantially the same way it is mounted on another file storage unit 14. Also, more than one accessory 18 may be mounted on the file storage units 14, the accessories 18 themselves may be mounted on one another in substantially the same manner as the file storage units 14 are mounted on each other.

What is claimed is:

1. A storage unit comprising:
a cabinet having a bottom panel, a pair of side panels interconnected to said bottom panel and extending upwardly therefrom, a rear panel including a hook interconnected with at least one of said side panels to resist lateral movement of said side panel with respect to said rear panel, said rear panel extending upwardly from said bottom panel, and a top panel interconnected to said side and rear panels, and wherein said bottom, side, and rear panels are interconnected by a plurality of snap-fit connections to define a forwardly-opening cavity between said panels; and
a drawer slidably received within said forwardly-opening cavity, said drawer having an upwardly-opening cavity; whereby said cabinet is assemblable without the use of tools.

2. The storage unit of claim 1, wherein one of said bottom panel and said side and rear panels includes a plurality of slots, and wherein the other of said bottom panel and said side and rear panels includes a plurality of tabs, and wherein said cabinet is assembled without tools by inserting said tabs into said slots.

3. The storage unit of claim 2, wherein each tab includes a ledge that locks adjacent panels together when said ledge is extended through said slot.

4. The storage unit of claim 1, wherein said panels having integrally-formed stiffeners.

5. The storage unit of claim 4, wherein said panels and stiffeners are constructed of injection-molded plastic.

6. The storage unit of claim 1, wherein said cabinet is disassemblable without the use of tools.

7. The storage unit of claim 1, further comprising a roller rotatably mounted on said drawer to facilitate sliding said drawer into and out of said forwardly-opening cavity.

8. The storage unit of claim 7, further comprising at least one guide member mounted within said forwardly-opening cavity, and wherein said roller is received by said guide member to facilitate sliding said drawer into and out of said forwardly-opening cavity.

9. The storage unit of claim 1, wherein said drawer includes at least one elongated member extending along an undersurface of the drawer, and wherein said cabinet includes at least one elongated member abutable against said elongated member of said drawer to resist lateral motion of said drawer.

10. The storage unit of claim 1, wherein said cabinet includes a lip positioned to interfere with said drawer to resist full removal of the drawer from said forwardly-opening cavity.

11. The storage unit of claim 1, wherein said drawer includes a plurality of panels that are interconnected without the use of tools.

12. The storage unit of claim 11, wherein said drawer panels include stiffeners.

13. The storage unit of claim 1, wherein said drawer includes a front panel having a handle.

14. The storage unit of claim 13, wherein said handle is a recessed portion in said front panel.

15. The storage unit of claim 1, wherein said drawer includes a rear panel and a side panel, said rear panel including a channel into which an edge of said side panel is inserted.

16. The storage unit of claim 1, wherein said drawer includes a drawer side panel having a flange and a flexible tab, and a drawer bottom panel, said flexible tab yielding to permit positioning of said drawer bottom panel against said flange, and biased to abut said drawer bottom panel and hold said drawer bottom panel against said flange.

17. A file storage unit comprising:
a bottom panel including an upper surface having elongated stiffening members;
a pair of side panels releasably interconnected with said bottom panel;
a rear panel releasably interconnected with said side panels and with said bottom panel;
a top panel releasably interconnected with said side panels and said rear panel; and
a drawer including an undersurface having longitudinally-extending stiffeners, said stiffeners of said drawer cooperating with said elongated stiffening members of said bottom panel to stiffen said file storage unit;
whereby said bottom, top, rear, and side panels together define a cavity, and wherein said drawer is slidably received within said cavity, and whereby said panels may be interconnected and disconnected without the use of tools.

18. The file storage unit of claim 17, further comprising a roller mounted to said drawer for rotation with respect to said drawer, said roller facilitating sliding said drawer with respect to said cavity.

19. The file storage unit of claim 17, wherein said drawer includes a pair of rollers, and wherein said side panels include guides in which the respective rollers are received, said guides at least partially supporting the weight of said drawer through said rollers.

20. The file storage unit of claim 17, wherein said bottom panel includes a slot adjacent each of said side panels and said rear panel, and wherein each of said side panels and said rear panel includes a tongue member, said tongue member being insertable into said slot to releasably interconnect said side panels and rear panel with said bottom panel.

21. The file storage unit of claim 17, wherein at least one side panel is releasably interconnected with said bottom panel with a tongue and slot.

22. The file storage unit of claim 17, wherein:

at least one of said side panels includes a tongue, said base panel includes a slot, said tongue includes a ledge, and is flexible between a lock position and a clearance position, said tongue being biased toward said lock position, and said tongue is deflectable to said clearance position for insertion into said slot, and wherein said tongue returns to said lock position upon said ledge passing entirely through said slot.

23. The file storage unit of claim 17, wherein said panels are constructed of a thermoplastic material.

24. The file storage unit of claim 17, further comprising a second file storage unit having a second bottom panel releasably interconnected with said top panel.

25. The file storage unit of claim 17, wherein said drawer includes a plurality of panels that are interconnectable without the use of tools.

* * * * *